United States Patent
Zhang et al.

(10) Patent No.: US 9,157,811 B2
(45) Date of Patent: Oct. 13, 2015

(54) DISPERSION AND LOSS SPECTRUM AUTO-CORRECTION DISTRIBUTED OPTICAL FIBER RAMAN TEMPERATURE SENSOR

(75) Inventors: Zaixuan Zhang, Zhejiang (CN); Chenxia Li, Zhejiang (CN); Jianfeng Wang, Zhejiang (CN); Xiangdong Yu, Zhejiang (CN); Wensheng Zhang, Zhejiang (CN); Wenping Zhang, Zhejiang (CN); Xiaohui Niu, Zhejiang (CN)

(73) Assignee: CHINA JILIANG UNVIVERSITY, Zhejiang (CN)

( * ) Notice: Subject to any disclaimer, the term of this patent is extended or adjusted under 35 U.S.C. 154(b) by 458 days.

(21) Appl. No.: 13/637,890

(22) PCT Filed: Aug. 20, 2010

(86) PCT No.: PCT/CN2010/076165
§ 371 (c)(1),
(2), (4) Date: Sep. 27, 2012

(87) PCT Pub. No.: WO2011/127704
PCT Pub. Date: Oct. 20, 2011

(65) Prior Publication Data
US 2013/0028289 A1    Jan. 31, 2013

(30) Foreign Application Priority Data

Apr. 13, 2010 (CN) .......................... 2010 1 0145912

(51) Int. Cl.
*G01K 7/00* (2006.01)
*G01K 11/32* (2006.01)

(52) U.S. Cl.
CPC ..................... *G01K 11/32* (2013.01)

(58) Field of Classification Search
CPC combination set(s) only.
See application file for complete search history.

(56) References Cited

U.S. PATENT DOCUMENTS 7,697,121 B1 *  4/2010  Coroy et al. ................. 356/35.5
8,201,996 B1 *  6/2012  Gaeta ............................ 374/131
(Continued)

FOREIGN PATENT DOCUMENTS

| CN | 101162175 | 4/2008 |
|---|---|---|
| CN | 101639388 | 2/2010 |
| JP | 2008-203094 | 9/2008 |

OTHER PUBLICATIONS

International Search Report cited in PCT/CN2010/076165 dated Oct. 20, 2011.

*Primary Examiner* — Lisa Caputo
*Assistant Examiner* — Nasir U Ahmed
(74) *Attorney, Agent, or Firm* — Workman Nydegger

(57) ABSTRACT

A dispersion and loss spectrum auto-correction distributed optical fiber Raman temperature sensor has a dual fiber pulsed laser module with dual Raman wavelength shifts. The laser module is composed of a power supply (11), an electronic switch (12), a primary laser (13) and a secondary laser (14), a first combiner (15), a bidirectional coupler (16), a multimode fiber (17), an integrated optical fiber wavelength division multiplexer (18), a second combiner (19), a direct detection system (20), a signal collection and processing system (21) and a display (22). The sensor uses two light sources that have two Raman wavelength shifts, wherein the central wavelength of backward anti-Stokes Raman scattering peak of the primary light source coincides with that of the backward Stokes scattering peak center wavelength of the secondary light source, and the time domain reflection signal of the one-way optical fiber Rayleigh scattering is deducted. Based on the optical fiber Raman scattering temperature measurement principle, the dispersion and loss spectrum auto-correction method and the optical time domain reflection principle, the optical fiber dispersion and the loss spectrum can be self-corrected, and the random power loss caused by bending and stretching in installation can also be auto-corrected.

6 Claims, 1 Drawing Sheet

(56) References Cited

U.S. PATENT DOCUMENTS

2001/0013934 A1* 8/2001 Varnham et al. ............. 356/478
2006/0214098 A1* 9/2006 Ramos .......................... 250/256
2006/0245468 A1* 11/2006 Hartog .......................... 374/161
2007/0223556 A1 9/2007 Lee et al.

* cited by examiner

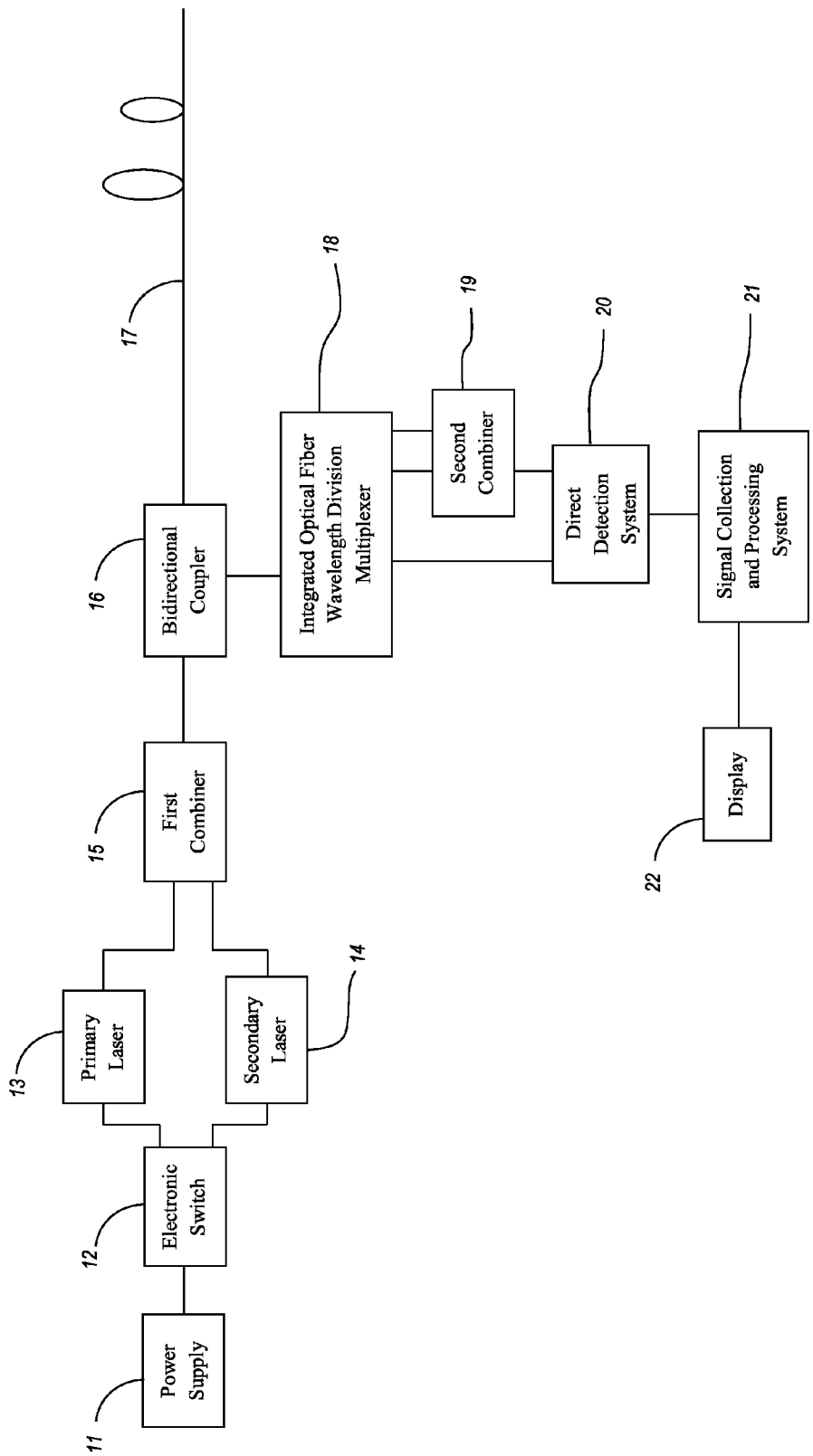

DISPERSION AND LOSS SPECTRUM AUTO-CORRECTION DISTRIBUTED OPTICAL FIBER RAMAN TEMPERATURE SENSOR

TECHNICAL FIELD

The present invention relates to a technical field of optical fiber sensing, and specifically to a dispersion and loss spectrum auto-correction distributed optical fiber Raman temperature sensor.

BACKGROUND OF THE INVENTION

In recent years, by means of the temperature modulation effect of optical fiber Raman scattering light intensities and the optical time domain reflection (OTDR) principle, distributed optical fiber Raman temperature sensors have been developed. They can be used to measure the on-site temperature in real time, predict the temperature change trend, monitor the on-site temperature change and provide on-line temperature alarming when the measured temperature is over a certain range. The distributed optical fiber Raman temperature sensor is a linear temperature response detector of safe type in nature and easy to build an optical fiber sensor network. It has been successfully applied in the fields of power industry, petrochemical enterprises, large scale civil engineering, on-line disaster monitoring, etc.

The optical fiber Raman scattering frequency shift is about 13.2 THz. So there is a relatively large wavelength difference between the anti-Stokes Raman scattering light and the Stokes Raman scattering light of the optical fiber. Due to the dispersion effect in optical fibers, the backward anti-Stokes Raman scattering light and the Stokes Raman scattering light have different transmission velocities in the optical fiber, thus leading to the "asynchronism" or "separation" phenomenon between the anti-Stokes Raman scattering light and the Stokes Raman scattering light in the time domain reflection curves. For distributed optical fiber Raman temperature sensors, the time domain reflection signal of the optical fiber backward Stokes Raman scattering light is used to demodulate the time domain reflection signal of the anti-Stokes Raman scattering light, in order to obtain temperature information of all segments of the optical fiber. However, the "asynchronism" or "separation" phenomenon happened in the two OTDR signals decreases the spatial resolution and temperature measurement precision of the sensor system, and even causes measurement errors. In a distributed optical fiber Raman temperature sensor, the anti-Stokes Raman scattering light is used as the temperature measurement signal channel, while the Stokes Raman scattering light is used as the temperature measurement reference channel. Since the two channels have quite different wavelength and the optical fiber attenuation losses are different for various wavelengths, they have different intensity losses. Therefore, when the Stokes Raman reference channel is used to demodulate the anti-Stokes Raman signal, the demodulated temperature curve presents a non-linear feature. This causes the temperature measurement errors and decreases the temperature measurement precision. Additionally, when optical fibers are installed on-site, they are very likely bent and stretched which leads to non-linear optical effects in optical fibers, and causes power losses at different wavelengths. Furthermore, since both the magnitude and the position of the bend and the stretch in pressing of the optical fiber and optical cable are random and unpredictable, it is difficult to correct the measurement manually. Thus, an auto-correction method is needed.

In 2007, Chung E. Lee et al proposed a solution: "Methods and Apparatus for Dual Source Calibration for Distributed Temperature Systems" which has been granted a U.S. patent right (No. US2007/0223556A1), wherein dual light sources are employed, and the optical fiber backward anti-Stokes Raman scattering wave of the primary laser and the optical fiber Stokes Raman scattering wave of the secondary laser within the same waveband are alternately controlled by an optical fiber switch in a manner of time-division. The optical fiber backward anti-Stokes Raman scattering wave of the primary laser is demodulated by the optical fiber Stokes Raman scattering wave of the secondary laser so as to obtain the temperature information of all segments of the optical fiber. In such round trip Raman scattering OTDR signals, though the return thereof fall within the same waveband, the wavelength of the incident waves lies in the primary laser wavelength and the secondary laser wavelength which differ from each other by a dual Raman shift, so that the influences of the optical fiber dispersion spectrum and the optical fiber loss spectrum cannot be eliminated completely.

SUMMARY OF THE INVENTION

Considering the shortages in the related art, the present invention is to provide a dispersion and loss spectrum auto-correction distributed optical fiber Raman temperature sensor. The sensor according to the present invention is low-cost, simple and reliable in structure, and can self-correct the optical fiber dispersion, attenuation loss spectrum and the non-linear loss caused by the bend and the stretch in the on-site installation of the optical fiber cables.

According to an embodiment of the present invention, the dispersion and loss spectrum auto-correction distributed optical fiber Raman temperature sensor comprises: a dual fiber pulsed laser module having dual Raman shift wavelengths, which is consisted of a power supply, an electronic switch, a primary laser and a secondary laser; a first combiner; a bidirectional coupler; a multimode optical fiber; an integrated optical fiber wavelength division multiplexer; a second combiner; a direct detection system; a signal collection and processing system; and a display, wherein output terminals of the primary laser and the secondary laser are respectively connected with an input terminal of the first combiner, an output terminal of the first combiner is connected with an input terminal of the bidirectional coupler, an output terminal of the bidirectional coupler is connected with an input terminal of the multimode optical fiber, backward Rayleigh scattering and Raman scattering echoes of the multimode optical fiber enter an input terminal of the integrated optical fiber wavelength division multiplexer through the bidirectional coupler. The integrated optical fiber wavelength division multiplexer has three output ports, the first output port is an output port for the central wavelength of Raman scattering peak, the second output port is an output port for the optical fiber backward Rayleigh scattering wave of the primary laser wavelength, the third output port is an output port for optical fiber backward Rayleigh scattering wave of secondary laser wavelength. The first output port of the integrated optical fiber wavelength division multiplexer is connected with an input terminal of the direct detection system, the second and third output ports of the integrated optical fiber wavelength division multiplexer are respectively connected with two input terminals of the second combiner, an output terminal of the second combiner is connected with another input terminal of the direct detection system, an output terminal of the direct detection system is connected with an input terminal of the signal collection and processing system, and the signal collection and processing system provides temperature values in various segments of the optical fiber to be shown by the display.

In the above-mentioned dual fiber pulsed laser module having dual Raman shift wavelengths, a fiber pulsed laser with the central wavelength of 980 nm, the spectrum width of 1nm, the laser pulse width of 18 ns and the peak power of 7 W may be used as the primary laser; a fiber pulsed laser with the central wavelength of 905 nm, the spectrum width of 1 nm, the laser pulse width of 18 ns and the peak power of 8 W may be used as the secondary laser. The primary laser and the secondary laser are switched by the electronic switch with a set time interval to operate alternately.

The primary laser and the secondary laser in the dual fiber pulsed laser module having dual Raman shift wavelengths also can be other pairs unlike the above mentioned, such as 1660 nm and 1450 nm, 1064 nm and 980 nm, or others that meet the dual Raman shift difference requirement.

The wavelength difference between two lasers is the dual Raman shift wavelength difference. The two lasers are driven synchronously by the power supply with a repetition frequency of 8 kHz, and are alternately switched on by the electronic switch with a certain interval period (10 seconds, for example). The time-division dual-wavelengths fiber pulsed laser light switched by the electronic switch passes through the first combiner and the bidirectional coupler, and enters the multimode temperature sensing fiber. The backward Rayleigh scattering and Raman scattering echoes of the optical fiber enter the integrated optical fiber wavelength division multiplexer through the bidirectional coupler. At the first output port of the integrated optical fiber wavelength division multiplexer and the direct detection system, the time-division OTDR signals of optical fiber backward anti-Stokes Raman scattering wave of the primary laser and optical fiber Stokes Raman scattering wave of the secondary laser within the same primary wavelength waveband are thus obtained. These round-trip OTDR signals, though their echoes are within the same waveband, have incident waves between the primary laser wavelength and the secondary laser wavelength which differ from each other by a dual Raman shift wavelength, and can not eliminate the effects due to the optical fiber refractive index and loss spectrum in different waveband. Therefore, it is necessary to utilize the signal collection and processing system to deduct the single-trip optical fiber Rayleigh wave OTDR signals of the primary and the secondary laser wavelength.

The method employed includes: the second output port and the third output port of the optical fiber wavelength division multiplexer are connected with another terminal of the direct detection system via the second combiner, thus the optical fiber backward Rayleigh wave OTDR signals of the primary and the secondary laser, which are round-trip in a manner of time-division, are obtained. The two single-trip optical fiber backward Rayleigh wave OTDR signals of the primary and the secondary laser wavelength at different wavebands are obtained by the signal collection and processing system, respectively. Then the single-trip optical fiber backward Rayleigh wave OTDR signal of the primary laser wavelength in the optical fiber backward anti-Stokes Raman scattering wave OTDR signal of the primary laser and the single-trip optical fiber backward Rayleigh wave OTDR signal of the secondary laser wavelength in the optical fiber backward anti-Stokes Raman scattering wave OTDR signal of the secondary laser wavelength are deducted respectively by means of the signal collection and processing system, obtaining the intensity ratio of single-trip optical fiber backward anti-Stokes Raman scattering wave OTDR signal of the primary laser with respect to single-trip optical fiber Stokes Raman scattering wave OTDR signal of the secondary laser which are within the same waveband, temperature information for each segment of the optical fiber is obtained based on the optical fiber Raman temperature measurement principle, achieving dispersion and loss spectrum auto-correction.

The measurement principle of the present dispersion and loss spectrum auto-correction distributed optical fiber Raman temperature sensor is shown as follows:

Raman scattering is one of the non-linear optical effects. When a laser light interacts with the optical fiber molecules, an incident photon is scattered by molecules and changes to low-frequency Stokes photon or high-frequency anti-Stokes photon. At the same time, the corresponding molecules complete transitions between two vibrational states. The photon is referred to as a Stokes Raman photon after the photon emits a phonon during the scattering. The photon is referred to as an anti-Stokes Raman photon after the photon absorbs a phonon during the scattering. For optical fiber molecules, the optical phonon frequency is around 13.2 THz. The number of particles for thermal distribution on the optical fiber molecule energy levels follows the Boltzmann law. So the intensity ratio $R(T,l)$ of the anti-Stokes Raman scattering light with respect to the Stokes Raman scattering light is determined as:

$$R(T, l) = \left[\frac{v_{as}}{v_s}\right]^4 \exp\left(-\frac{hc\Delta v}{kT}\right) \exp[-(\alpha_{as} - \alpha_s)l] \quad (1)$$

wherein $v_{as}$ and $v_s$ are the frequencies of the anti-Stokes Raman scattering light and the Stokes Raman scattering light, respectively, h is the Planck constant, h=6.626 068 76.52× $10^{-34}$ J·s (the basic physics constant in 1998), c is the velocity of light in vacuum, $\Delta v$ is the phonon frequency of the optical fiber molecule and equals to 13.2 THz, k is the Boltzmann constant, k=1.380 650324×$10^{-23}$ JK$^{-1}$, T is the Kelvin absolute temperature, $\alpha_{as}$ and $\alpha_s$ are optical fiber attenuation coefficients of the anti-Stokes Raman scattering light and the Stokes Raman scattering light, respectively.

The intensity ratio of single-trip backward anti-Stokes Raman light of the primary laser with respect to the single-trip backward Stokes Raman light of the secondary laser is:

$$R(T) = \frac{I_{1,AS}}{I_{2,S}} = \frac{I_1}{I_2}\left(\frac{v_{1,AS}}{v_{2,S}}\right)^4 \exp\left(-\frac{hcv}{kT}\right)\frac{\exp-\alpha_{1,As} \cdot l}{\exp-\alpha_{2,S} \cdot l} \quad (2)$$

wherein the single-trip backward anti-Stokes Raman light of the primary laser and the single-trip backward Stokes Raman light of the secondary laser are within the same waveband, i.e. $v_{1,AS}=v_{2,S}, \alpha_{1,AS}=\alpha_{2,S}$, Thus the equation (2) is simplified as:

$$R(T) = \frac{I_{1,AS}}{I_{2,S}} = \frac{I_1}{I_2}\exp\left(-\frac{hcv}{kT}\right) \quad (3)$$

If the temperature of an optical fiber section immediately before the temperature sensing fiber is known as $T=T_0$, the temperatures of various segments of the temperature sensing fiber is obtained by the known Raman light intensity ratio and the equation (3):

$$T = \left[\frac{1}{T_0} - \frac{k}{hcv}\ln\left(\frac{R(T)}{R(T_0)}\right)\right] \quad (4)$$

The advantages of the present invention include:

According to the present invention, the dispersion and loss spectrum auto-correction distributed optical fiber Raman temperature sensor may employ low-cost and reliable electronic switch to replace the expensive optical fiber switch. Also the electronic switch is simple in structure, excellent in signal-to-noise ratio, and good in reliability. As the single-trip backward anti-Stokes Raman light of the primary laser and the single-trip backward Stokes Raman light of the secondary laser are within the same waveband, dispersion and loss spectrum of the optical fiber as well as the random loss caused by bending and stretching in real installations can be self-corrected. Therefore, the temperature measurement error caused by departure from linearity when using the Stokes Raman reference channel to demodulate the anti-Stokes Raman signal channel in the temperature measurement system is overcome. According to the present invention, the electronic switch can be employed to control the two light sources with dual Raman shift wavelength differences, the integrated wavelength division multiplexer and the direct detection system. It also can improve the signal-to-noise ratio, reliability and spacial resolution of the distributed optical fiber Raman photon temperature sensor system. The temperature sensing fiber laid for monitoring on-site can be insulative, non-electriferous, immune to electromagnetic interference, radiation resistant, corrosion resistant, and safe in nature. The optical fiber acts as both the transferring media and the sensing media, can be a temperature sensing fiber of an intrinsic type, and have long working life for over 30 years.

DESCRIPTION OF THE DRAWINGS

FIG. 1 is a schematic view of a dispersion and loss spectrum auto-correction distributed optical fiber Raman temperature sensor, wherein a power supply 11, an electronic switch 12, a primary laser 13 and a secondary laser 14, a first combiner 15, a bidirectional coupler 16, a multimode optical fiber 17, an integrated optical fiber wavelength division multiplexer 18, a second combiner 19, a direct detection system 20, a signal collection and processing system 21, and a display 22 are illustrated.

DESCRIPTION OF EXEMPLARY EMBODIMENTS

Referring to the FIG. 1, a dispersion and loss spectrum auto-correction distributed optical fiber Raman temperature sensor comprises: a dual fiber pulsed laser module having dual Raman shift wavelengths consisting of a power supply 11, an electronic switch 12, a primary laser 13 and a secondary laser 14; a first combiner 15; a bidirectional coupler 16; a multimode optical fiber 17; an integrated optical fiber wavelength division multiplexer 18; a second combiner 19; a direct detection system 20; a signal collection and processing system 21; and a display 22. Output terminals of the primary laser 13 and the secondary laser 14 are connected with an input terminal of the first combiner 15, respectively. An output terminal of the first combiner 15 is connected with an input terminal of the bidirectional coupler 16; an output terminal of the bidirectional coupler 16 is connected with an input terminal of the multimode optical fiber 17. Backward Rayleigh scattering and Raman scattering echoes of the multimode optical fiber enter an input terminal of the integrated optical fiber wavelength division multiplexer 18 through the bidirectional coupler 16. The integrated optical fiber wavelength division multiplexer 18 has three output ports. The first output port is an output port for the central wavelength of Raman scattering peak. The second output port is an output port for optical fiber backward Rayleigh scattering wave of the primary laser wavelength. The third output port is an output port for optical fiber backward Rayleigh scattering wave of the secondary laser wavelength. The first output port of the integrated optical fiber wavelength division multiplexer 18 is connected with an input terminal of the direct detection system 20. The second and third output ports of the integrated optical fiber wavelength division multiplexer 18 are respectively connected with two input terminals of the second combiner 19. An output terminal of the second combiner 19 is connected with another input terminal of the direct detection system 20. An output terminal of the direct detection system 20 is connected with an input terminal of the signal collection and processing system 21. By means of the intensity ratio of the single-trip backward anti-Stokes Raman scattering wave of the primary laser with respect to the single-trip Stokes Raman scattering wave of the secondary laser (within the same waveband) processed by the signal collection and processing system 21, the temperature information for each segment of the optical fiber can be obtained, which is shown by the display 22.

The first output port of the above-mentioned integrated optical fiber wavelength division multiplexer 18 is consisted of a parallel optical fiber path and an optical filter with the central wavelength of 940 nm, the bandwidth of 15 nm and the insertion loss less than 0.5 dB. The anti-Stokes Raman scattering light (940 nm) signal of the primary laser with the wavelength of 980 nm and Stokes Raman scattering light (940 nm) signal of the secondary laser with the wavelength of 905 nm which both fall within the same waveband are outputted through the first output port in a manner of time-division. The second output port is consisted of a parallel optical fiber path and an optical filter with the central wavelength of 980 nm, the bandwidth of 3 nm and the insertion loss less than 0.5 dB; and the third output port is consisted of a parallel optical fiber path and an optical filter with the central wavelength of 905 nm, the bandwidth of 3 nm and the insertion loss less than 0.5 dB. The optical fiber Rayleigh scattering OTDR signals of the primary laser and the secondary laser are outputted in a manner of time-division by the second output port and the third output port via the second combiner 19.

The direct detection system 20 is formed by two optical fiber photoelectric receiving and amplifying modules, and it is consisted of a low-noise Si photoelectric avalanche diode equipped with optical fiber and a low-noise MAX4107 preamplifier and a primary amplifier.

The signal collection and processing system 21 can utilize a two-channel NI5911 signal processing card from U.S.A. NI (National Instruments) Inc., which has the bandwidth of 100 MHz and the sampling rate of 100 MS/s, or utilize a two-channel CS21GB-1 GHz signal processing card from Canada GaGe Inc. with the sampling rate of 500 MS/s.

The invention claimed is:

1. A dispersion and loss spectrum auto-correction distributed optical fiber Raman temperature sensor, comprising:
    a dual fiber pulsed laser module having dual Raman shift wavelengths, the laser module including a power supply, an electronic switch, a primary laser having a primary laser wavelength, and a secondary laser having a secondary laser wavelength;

a first combiner;
a bidirectional coupler;
a multimode optical fiber;
an integrated optical fiber wavelength division multiplexer;
a second combiner;
a direct detection system;
a signal collection and processing system; and
a display;
wherein output terminals of the primary laser and the secondary laser are connected with an input terminal of the first combiner, an output terminal of the first combiner is connected with an input terminal of the bidirectional coupler, and an output terminal of the bidirectional coupler is connected with an input terminal of the multimode optical fiber;
wherein backward Rayleigh scattering and Raman scattering echoes of the multimode optical fiber enter an input terminal of the integrated optical fiber wavelength division multiplexer via the bidirectional coupler, the integrated optical fiber wavelength division multiplexer having three output ports, the first output port being an output port for a central wavelength of Raman scattering peak, the central wavelength of Raman scattering peak including an anti-Stokes Raman scattering wave of the primary laser and a Stokes Raman scattering wave of the secondary laser within the same waveband, the second output port being an output port for an optical fiber backward Rayleigh scattering wave of the primary laser wavelength, and the third output port being an output port for the optical fiber backward Rayleigh scattering wave of the secondary laser wavelength;
wherein the first output port of the integrated optical fiber wavelength division multiplexer is connected with an input terminal of the direct detection system, the second and third output ports of the integrated optical fiber wavelength division multiplexer are connected with two input terminals of the second combiner, an output terminal of the second combiner is connected with another input terminal of the direct detection system, an output terminal of the direct detection system is connected with an input terminal of the signal collection and processing system, and an output terminal of the signal collection and processing system is connected with the display.

2. The dispersion and loss spectrum auto-correction distributed optical fiber Raman temperature sensor according to claim 1, wherein the primary laser is a fiber pulsed laser with a central wavelength of 980 nm, a spectrum width of 1 nm, a laser pulse width of 18 ns and a peak power of 7 W; the secondary laser is a fiber pulsed laser with a central wavelength of 905 nm, a spectrum width of 1 nm, a laser pulse width of 18 ns and a peak power of 8 W; and the primary laser and the secondary laser are connected with the power supply through the electronic switch.

3. The dispersion and loss spectrum auto-correction distributed optical fiber Raman temperature sensor according to claim 1, wherein the first output port of the integrated optical fiber wavelength division multiplexer includes a parallel optical fiber path and an optical filter with a central wavelength of 940 nm, a bandwidth of 15 nm and an attenuation loss less than 0.5 dB; the second output port includes a parallel optical fiber path and an optical filter with a central wavelength of 980 nm, a bandwidth of 3 nm and an attenuation loss less than 0.5 dB; and the third output port includes a parallel optical fiber path and an optical filter with a central wavelength of 905 nm, a bandwidth of 3 nm and an attenuation loss less than 0.5 dB.

4. The dispersion and loss spectrum auto-correction distributed optical fiber Raman temperature sensor according to claim 1, wherein the backward Rayleigh scattering wave of the primary laser wavelength and the backward Rayleigh scattering wave of the secondary laser wavelength are deducted from the central wavelength of Raman scattering peak so as to eliminate influences of optical fiber dispersion spectrum and optical fiber loss spectrum caused by incident waves from the primary laser and secondary laser, thereby providing an intensity ratio of the anti-Stokes Raman scattering wave of the primary laser with respect to the Stokes Raman scattering wave of the secondary laser.

5. A method of measuring temperature using a dispersion and loss spectrum auto-correction distributed optical fiber Raman temperature sensor, the method comprising:
delivering a first optical signal having a first wavelength and a second optical signal having a second wavelength to a multimode optical fiber using a dual fiber pulsed laser module having dual Raman shift wavelengths, the laser module including a power supply, an electronic switch, a primary laser having the first wavelength, and a secondary laser having the second wavelength, wherein output terminals of the primary laser and the secondary laser are respectively connected with an input terminal of the first combiner, an output terminal of the first combiner is connected with an input terminal of the bidirectional coupler, an output terminal of the bidirectional coupler is connected with an input terminal of the multimode optical fiber;
receiving backward Rayleigh scattering and Raman scattering echoes of the multimode optical fiber into an input terminal of the integrated optical fiber wavelength division multiplexer via the bidirectional coupler, the integrated optical fiber wavelength division multiplexer having three output ports, the first output port being an output port for a central wavelength of Raman scattering peak, the central wavelength of Raman scattering peak including an anti-Stokes Raman scattering wave of the primary laser and a Stokes Raman scattering wave of the secondary laser within the same waveband, the second output port being an output port for an optical fiber backward Rayleigh scattering wave of the first wavelength, the third output port being an output port for the optical fiber backward Rayleigh scattering wave of the second wavelength;
receiving the optical fiber backward Rayleigh scattering wave of the first wavelength from the second output port and the optical fiber backward Rayleigh scattering wave of the second wavelength of the third output port into a second combiner to form a combined Rayleigh signal, wherein an output terminal of the second combiner being connected to an input terminal of the direct detection system, an output terminal of the direct detection system being connected with an input terminal of the signal collection and processing system, and an output terminal of the signal collection and processing system being connected with the display;
receiving the central wavelength of Raman scattering peak and the combined Rayleigh signal into the signal collection and processing system, the signal collection and processing system deducting the backward Rayleigh scattering wave of the first wavelength and the backward Rayleigh scattering wave of the second wavelength from the central wavelength of Raman scattering peak so as to eliminate influences of optical fiber dispersion spectrum and optical fiber loss spectrum caused by incident waves from the primary laser and secondary laser, thereby providing an intensity ratio of the anti-Stokes Raman scattering wave of the primary laser with respect to the Stokes Raman scattering wave of the secondary laser.

6. A dispersion and loss spectrum auto-correction distributed optical fiber Raman temperature sensor, comprising:
- a dual fiber pulsed laser module having dual Raman shift wavelengths, the laser module including a primary laser having a primary laser wavelength and a secondary laser having a secondary laser wavelength;
- a first combiner;
- a bidirectional coupler;
- a multimode optical fiber;
- an integrated optical fiber wavelength division multiplexer;
- a second combiner;
- a direct detection system; and
- a signal collection and processing system;

wherein output terminals of the primary laser and the secondary laser are connected with an input terminal of the first combiner, an output terminal of the first combiner is connected with an input terminal of the bidirectional coupler, and an output terminal of the bidirectional coupler is connected with an input terminal of the multimode optical fiber;

wherein backward Rayleigh scattering and Raman scattering echoes of the multimode optical fiber enter an input terminal of the integrated optical fiber wavelength division multiplexer via the bidirectional coupler, the integrated optical fiber wavelength division multiplexer having three output ports, the first output port being an output port for a central wavelength of Raman scattering peak, the central wavelength of Raman scattering peak including an anti-Stokes Raman scattering wave of the primary laser and a Stokes Raman scattering wave of the secondary laser within the same waveband, the second output port being an output port for an optical fiber backward Rayleigh scattering wave of the primary laser wavelength, and the third output port being an output port for the optical fiber backward Rayleigh scattering wave of the secondary laser wavelength;

wherein the first output port of the integrated optical fiber wavelength division multiplexer is connected with an input terminal of the direct detection system, the second and third output ports of the integrated optical fiber wavelength division multiplexer are connected with two input terminals of the second combiner, an output terminal of the second combiner is connected with another input terminal of the direct detection system, and an output terminal of the direct detection system is connected with an input terminal of the signal collection and processing system, the signal collection and processing system being configured to deduct the backward Rayleigh scattering wave of the primary laser wavelength and the backward Rayleigh scattering wave of the secondary laser wavelength from the central wavelength of Raman scattering peak so as to eliminate influences of optical fiber dispersion spectrum and optical fiber loss spectrum caused by incident waves from the primary laser and secondary laser.

* * * * *